United States Patent

Bosio

[11] Patent Number: 6,060,688
[45] Date of Patent: May 9, 2000

[54] DEVICE FOR INTERNALLY BUTT-WELDING PIPES

[75] Inventor: Paolo Bosio, Torre Boldone, Italy

[73] Assignee: PSI Pipeline Service, S.A., Lugano, Switzerland

[21] Appl. No.: 09/011,789

[22] PCT Filed: Jul. 31, 1996

[86] PCT No.: PCT/EP96/03369

§ 371 Date: Feb. 25, 1998

§ 102(e) Date: Feb. 25, 1998

[87] PCT Pub. No.: WO97/09147

PCT Pub. Date: Mar. 13, 1997

[30] Foreign Application Priority Data

Sep. 8, 1995 [IT] Italy .............................. M1950620 U

[51] Int. Cl.[7] .............................. B23K 9/12; B23K 9/02; B23K 31/02
[52] U.S. Cl. .................................. 219/125.11; 219/60 R; 219/61
[58] Field of Search .................... 219/125.11, 60 R, 219/61

[56] References Cited

U.S. PATENT DOCUMENTS

| 3,461,264 | 8/1969  | Nelson et al.  | 219/60   |
| 3,551,636 | 12/1970 | Nelson         | 219/125  |
| 4,306,134 | 12/1981 | Slavens et al. | 219/60 A |
| 4,483,490 | 11/1984 | Engmann et al. | 242/25 R |

*Primary Examiner*—Patrick Ryan
*Assistant Examiner*—Anjan Dey
*Attorney, Agent, or Firm*—Steinberg & Raskin, P.C.

[57] ABSTRACT

A device for internally butt-welding pipes, of the type comprising a support and guide frame (2) for an annular welding member (3), rotatable coaxially to the pipes (1) to be welded and carrying a plurality of welding units (4) each comprising support means (13, 14; 40, 41; 40A, 41A; 45, 46) for a spool (8, 8A, 8B) on which welding wire (7) is wound, and means (26) for automatically feeding said wire. The support means (13, 14; 40 41; 40A; 41A; 45, 46) are removably connected to walls (10A, B) of a support frame (10) for the welding units (4) so as to enable said means to be replaced and spools of different type to be used.

20 Claims, 3 Drawing Sheets

DEVICE FOR INTERNALLY BUTT-WELDING PIPES

FIELD OF THE INVENTION

This invention relates to a device for internally butt-welding pipes of the type including a support and guide frame for an annular welding member rotatable coaxially to the pipes to be welded and carrying a plurality of welding units each including support means for a spool on which the welding wire is wound, the support means being removably connected to at least a wall of a support frame of the welding unit so as to enable the support means to be replaced and spools of different type to be used, and including a brake for the spool.

BACKGROUND OF THE INVENTION

Known devices of the aforesaid type use a spool of special dimensions, different from those of the spools usually used for the external welding of pipes. This has resulted in numerous problems up to the present time, mainly the fact that two different spool types have to be constantly available, resulting in supply and stocking problems, spools for internal welding being moreover not always easily available as they are of special type. These spools are also of relatively high cost compared with the spools usually used for external welding.

Replacing the spool is also relatively lengthy and complicated.

As a matter of fact, in the known devices to change a spool first the welding units have to be removed from their welding position to a replacement one and then the spool and, generally also the attached brake, may be removed.

It is to be noted that to obtain a good welding a correct position of the welding units is essential and therefore after a change of a spool the position of said units has to be checked and adjusted.

Checking or adjusting the welding wire feed means is not easy in the known devices because also for this operation welding units have to be removed from their welding position in order to perform said controls, and this causes the drawbacks mentioned before.

Moreover in most devices the configuration of the joints of the brake coaxial to the spool exposes it to frequent damage because to remove the spool the brake must generally also be removed.

U.S. Pat. No. 3,551,636 describes a device for internally butt-welding pipes wherein each of the welding units comprises a spool on which welding wire is wound and which is mounted with its axle fitted into support notches in the rear ends of a wire supply trailer frame. The trailer frame is pivotally attached to a movable drive frame of the device. A brake may be applied to the spool. In this case, when a spool is empty and has to be removed from its support notches, also the brake is removed. Therefore, it is necessary to use special spools incorporating a brake or else detach the brake from the empty spool and mount it on a new one.

In known devices of the aforesaid type the welding wire feed means also have considerable drawbacks.

This means comprise a motor of particularly sophisticated and costly type, together with two reduction gears, one epicyclic and the other angular.

Although the known feed means are highly efficient they have proved difficult to assemble and maintain, and are also of extremely high cost.

OBJECTS AND SUMMARY OF THE INVENTION

An object of the present invention is to provide a device for internally butt-welding pipes, in which replacing the spools of the welding units is simplified and does not need the movement of the welding units from their welding position.

A further object is to provide a device which enables spools of any type to be used.

A further object is to provide a device in which the welding wire feed means may be checked or adjusted without moving the welding units from their welding position.

A further object is to provide a device in which the spools of welding wire may be removed without removing also the brake of the spool.

A further object is to provide a device in which the wire feed means are easy to assemble and maintain and are of low cost.

These and further objects which will be apparent to an expert of the art are attained by a device in accordance with the present invention which includes a device for internally butt-welding pipes wherein the brake is pivot including a member rigidly fixed to the support means and a rotating element carrying the spool, the pivot including braking means acting on the surface of the rotating element, and the support means are shaped and are connected to the wall in such a way that the spool may be removed without moving the welding units from the welding member.

BRIEF DESCRIPTION OF THE DRAWINGS

The present invention will be more apparent from the accompanying drawings, which are provided by way of non-limiting example and in which.

DETAILED DESCRIPTION OF THE PREFERRED EMBODIMENTS

Figure 1:
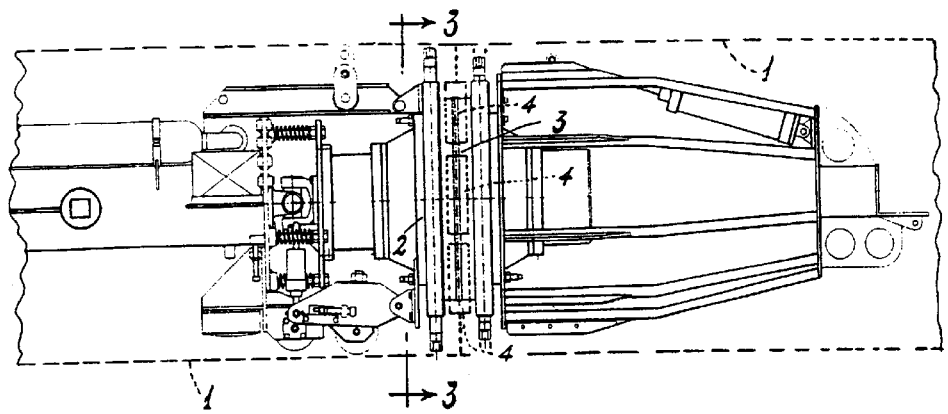
FIG. 1 is a partial schematic side view of a device according to the invention.

FIG. 1 shows a usual device for internally butt-welding pipes 1 (shown partially by dashed lines in FIG. 1), of the type comprising a support and guide frame 2 for an annular welding member 3, rotatable coaxially to the pipes to be welded and carrying a plurality (three are shown by dashed lines in the figure) of welding units 4.

A device of the aforesaid type has been known for some time and will thereofre not be described in detail hereinafter.

The welding units 4 shown in detail in FIGS. 2–11 comprise, fixed in conventional manner to a usual upperly open box support frame 10 with side wals 10A, 10B connected together by cross-members 11A–E, a welding head 9 and means 12 for automatically moving the head from a rest position (FIG. 3) to an operating position (not shown). Said components are all of conventional type to the expert of the art and will therefore not be described in detail hereinafter. The welding unit 4 also comprises a spool 8 on which welding wire 7 is wound and a unit 6 for feeding this wire to the welding head 9.

Figure 2:
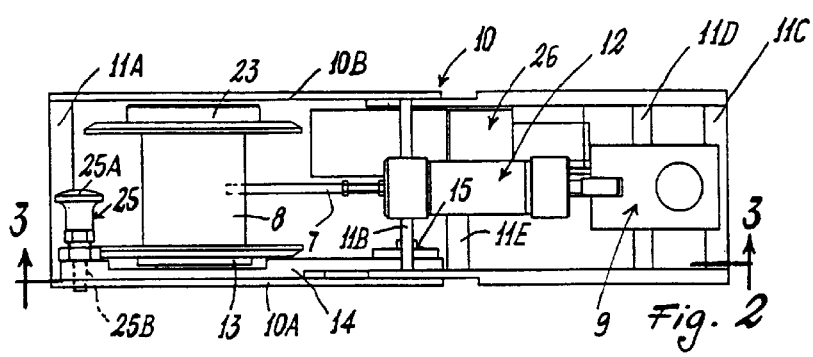
FIGS. 2, 3 and 4, to a different scale than FIG. 1, are respectively a shematic view from above, a side view taken on the line 3—3 of FIG. 2, and a side view taken in the direction of the arrow Q of FIG. 3, shown partly sectioned and with a movable arm in two different utilization positions (one positon being shown by dashed lines), of a welding unit according to the invention.
Figure 3:
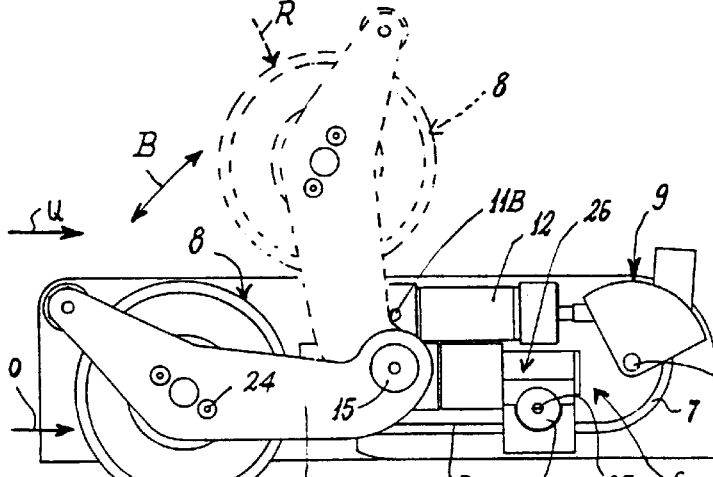
Figure 4:
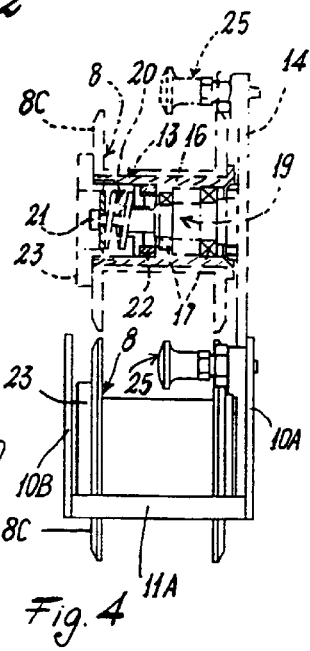

More specifically, with reference to FIGS. 2–4, the spool 8 is of the type usually used for externally welding pipes and is supported by a pivot 13 (FIG. 4) fixed to an arm 14 hinged at 15 to the side wall 10A of the welding unit.

The pivot 13 is of the braked type and comprises an outer cylindrical first element 16 on which the spool 8 is mounted and which is connected by bearings 17 to a central member 19 rigidly fixed to the arm 14. At its free end the central member 19 comprises a brake 20 with a screw 21, which can be adjusted to regulate the action of braking jaws 22 acting on the element 16.

At its free end this latter is closed by a screw cap 23 acting also as a lateral clamping support for the spool 8.

It is to be noted that thanks to the screw cap 23 the braking action is transmitted on the external lateral side 8C of the spool. Moreover advantageously the screw cap has a thread opposed to the sense of rotation of the spool so that it can not be unscrewed from the element 16.

The arm 14 is hinged in a manner conventional to the expert of the art at 15 to the side wall 10A of the unit, is rigidly fixed by two screws 24 (FIG. 3) to the pivot 13 and carries at its free end a usual member 25 for locking the arm 14 to the wall 10A. The member 25, of conventional type, comprises a knob 25A which when operated allows a stem 25B to be inserted into or removed from a hole provided in the wall 10A so as to be able to lock the arm 14 to the wall 10A in its operating position (FIG. 3) or to allow it to rotate upwards (see arrow B of FIG. 3) into a position R (FIG. 3) which extremely facilitates the operations involved in replacing the spool 8 and in checking or adjusting the wire feed means 6. By virtue of the arm 14 these operations are considerably simplified, and in fact to change a spool, having raised the arm 14 it is necessary merely to unscrew the cap 23, mount a spool and again lower the arm into position 0.

It should also be noted that if non-standard spools are to be used, for examle of the type used up to the present time in known welding units, the pivot 13 has merely to be replaced with another pivot of similar type and suitable size.

This is also particularly simple to do, it being necessary merely to unscrew the screws 24 which fix the pivot 13 to the arm 14.

It is to be noted that to change a spool it is no more necessary to move the welding unit from its welding position. Moreover, when the arm 14 is raised there is enough space to perform any required check or adjustment on the feeding means 6 or to other parts of the device positioned in correspondence of the spool.

Figure 13:
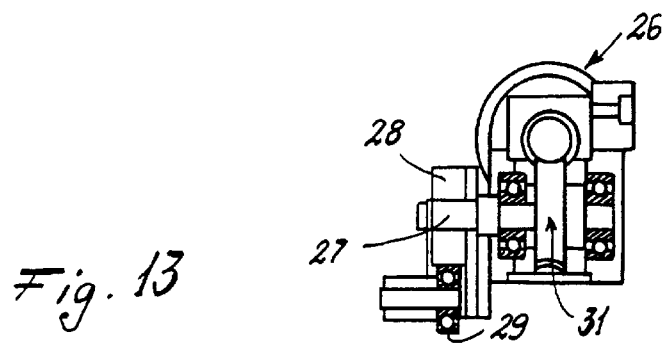

The unit 6 for feeding the wire 7 to the welding head comprises a geared motor unit 26, on the motorized output shaft 27 of which there is keyed a first drive wheel 28 (FIG. 3) which, cooperating with an underlying idle wheel 29 (shown in FIG. 13), advances the wire 7 towards the head 9.

Figure 12:
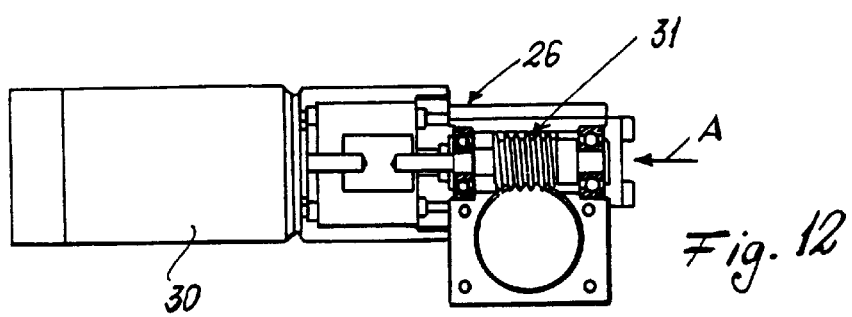
FIGS. 12, 13 show respectively a partly sectional schematic view from above and a partly sectional side view taken in the direction of the arrow A of FIGS. 12, of welding wire feed means.

The geared motor unit 26 (FIGS. 12, 13) comprises an electric motor 30, advantageously of direct current type powered at 24 volts, and of relatively high power compared with that of conventionally used motors, and a worm reducer 31, with an output shaft 27 on which the drive wheel 28 is keyed to cooperate with the underlying idle wheel 29, which in the illustrated embodiment is a usual bearing for driving the wire 7.

It should be noted that the motor 30 is of conventional type and is therefore of extremely low cost, is reliable, and is of simple assembly and maintenance, the reducer 31 also being of low cost and extremely simple and reliable compared with the feed unit usually mounted on traditional welding units.

FIGS. 5–9 show two modifications of the welding unit shown in FIGS. 2–4. Those elements in common with this latter embodiment are indicated by the same reference numerals.

Figure 5:
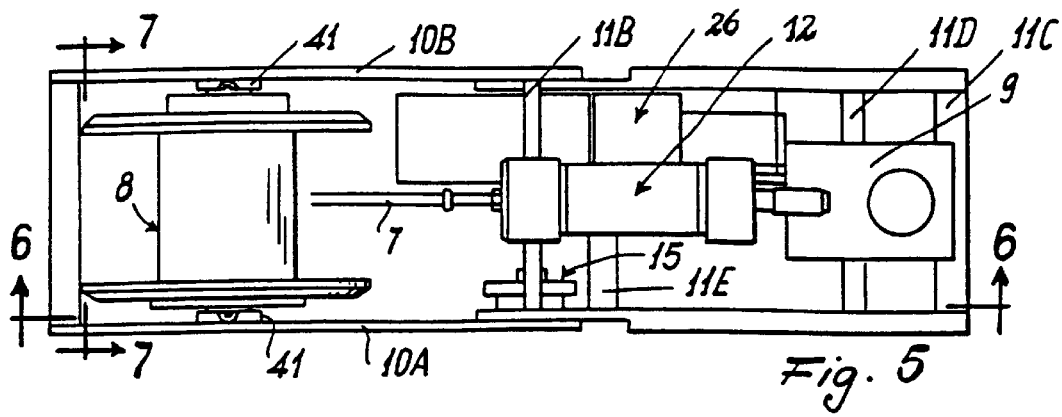
FIGS. 5, 6 and 7 show respectively a schematic view from above, a side view taken on the line 6—6 of FIG. 5, and a rear view taken on the line 7—7 of FIG. 5, of a first modification of the welding unit.
Figure 6:
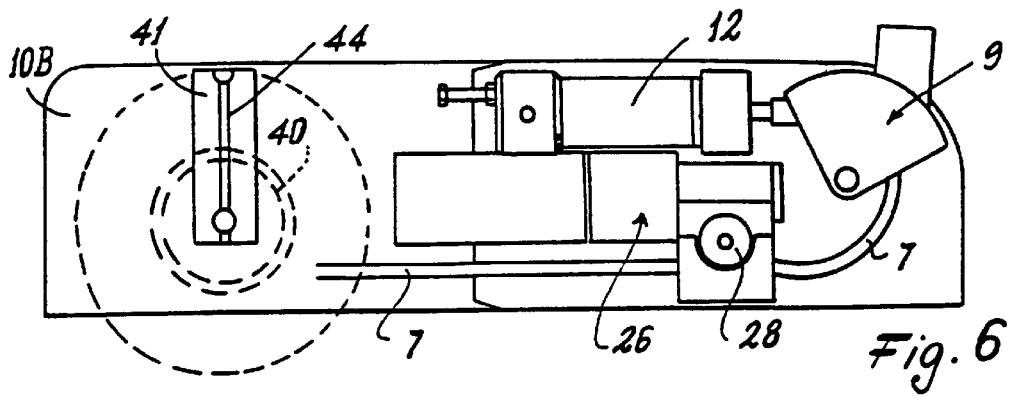
Figure 7:
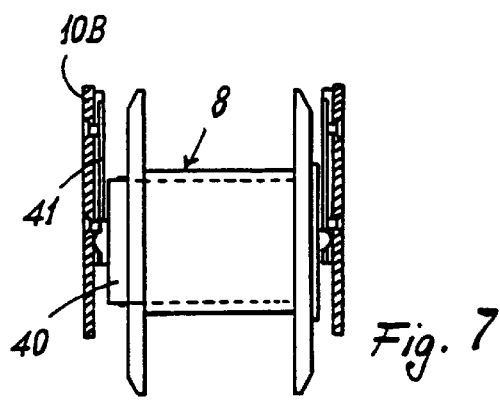

The first modification shown in FIGS. 5–7 comprises a spool 8 of identical type to that shown in FIGS. 2–4. This spool is however mounted on a braked pivot 40 of different type, snap-fitted to support blocks 41 rigidly fixed to the side walls 10A, B of the frame of the welding unit. The braked pivot 40 is of conventional type, a similar pivot (indicated by 40A in FIG. 8) already being used, but of smaller size, for the spools 8A (FIGS. 8, 9), also of smaller size, usually used in known welding units. The support blocks are removably fixed to the side walls 10A, B, by screw 43. Holes, advantageously threaded, for the passage and/or engagement of said screws, are provided in predetermined positions in the side walls for this purpose.

Advantageously, in that face facing the spool the blocks comprise a slot 44 for facilitating the insertion of the support pivot 40, and at their lower end a seat 44A for the snap-engagement of said braked pivot 40.

Figure 9:
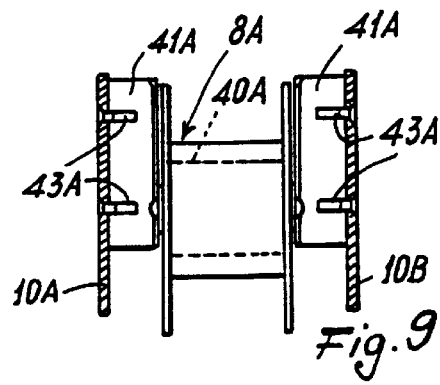
Figure 8:
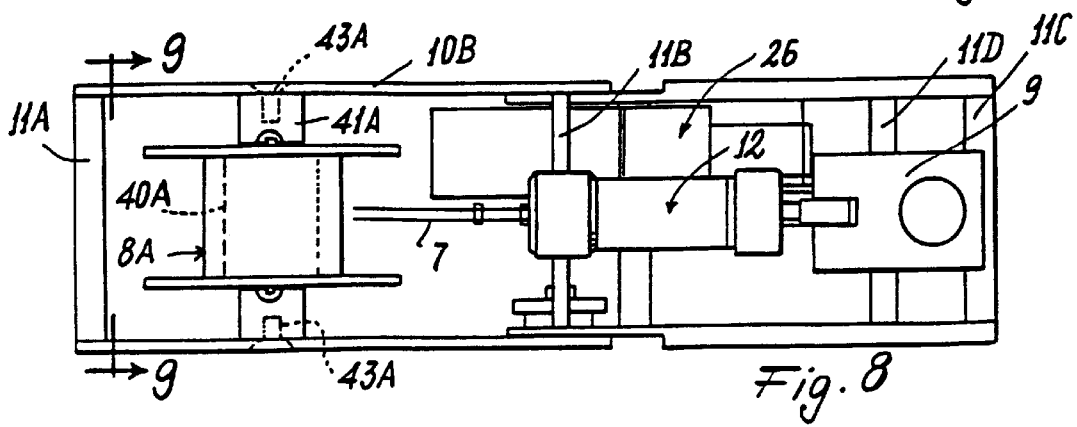
FIG. 8, 9 show respectively a schematic view from above and a rear view taken on the line 9—9 of FIG. 8, of a second modification of the welding unit.

As already stated, the known welding units use a conventional spool 8A of smaller size than the previously described spools 8 (shown in FIGS. 8–9). To use this type of spool in the unit of FIGS. 2–4, it is necessary merely to remove the arm 14 and fix the support blocks 41A to the walls 10A, 10B. To use it in the unit of FIGS. 5–7 it is necessary merely to replace the blocks 41 by the blocks 41A. In this manner th various types of spools available can be used in the welding units by means of relatively simple and fast operations.

Figure 10:
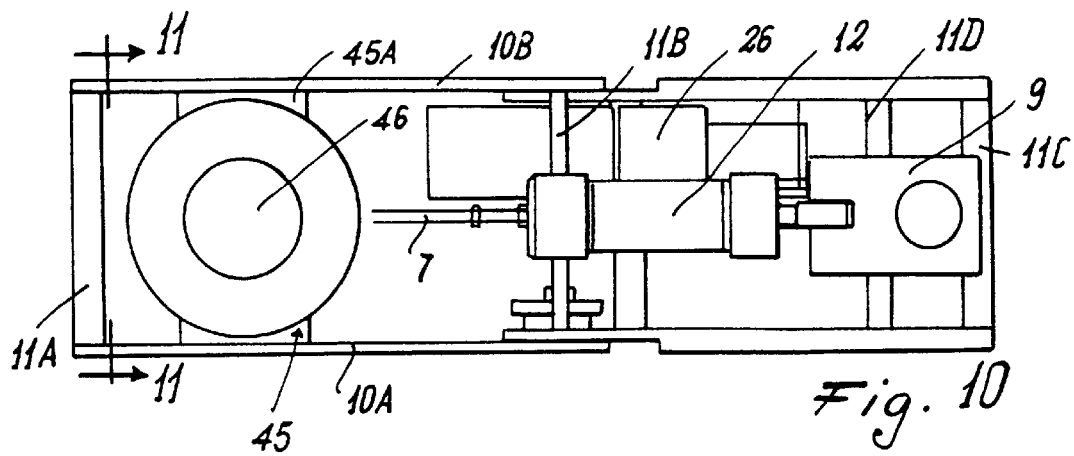
FIGS. 10, 11 show respectively a schematic view from above and a rear view taken on line 11—11 of FIG. 10, of a third modification of the welding unit.
Figure 11:
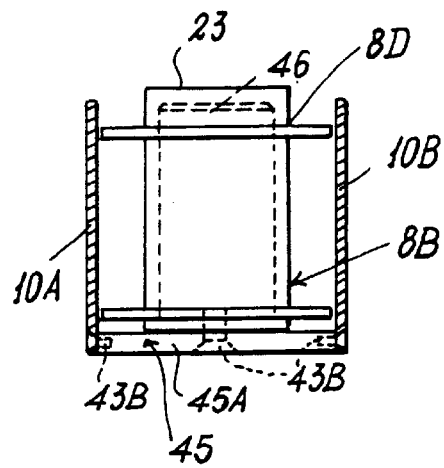

Finallly, FIGS. 10, 11 show a further modification of the welding unit, in which a spool 8B is arranged with its axis parallel to the side wall 10A, B of the unit frame.

For this purpose a bridge support 45 is provided comprising a base wall 45A to which a braked support pivot 46 for the spool 8B is fixed. The base wall 45A is removably fixed, for example by screws 43B, to the side wall 10A, B of the frame. The pivot 46 is advantageously removably connected to the support 45 so as to be able to be easily replaced by another pivot if a different type of spool is to be used.

The braked pivot 46 is advantageously of the same type shown in FIG. 4; the breaking action is transmitted to the superior wall 8D of the spool 8B by a screw cap 23 of the same type described before.

It should be noted that this latter arrangement is particularly advantageous because it considerably reduces the operations required to mount the spool on the support pivot. It is to be noted that a bridge support similar to that represented in FIGS. 10–11 may be fixed also to the movable arm 14, in order to permit also a vertical arrangement of the spools, on the movable arm.

This "vertical" arrangement of the spools limit the height of the welding unit, which is particularly useful for devices required to weld pipes of smaller diameter.

Finally it should be noted that the embodiments described heretofore are described by way of example only, and that numerous modifications are possible all falling within the same inventive concept, for example the shape of the movable arm 14 could be different from that shown, as could the means for fixing the blocks 41, 41A, 45 to the walls 10A, B.

What is claimed is:

1. In a device for internally butt-welding pipes, of the type comprising a support and guide frame for an annular welding member, rotatable coaxially to the pipes to be welded and carrying a plurality of welding units each comprising support means for a spool on which the welding wire is wound, said support means being removably connected to at least a wall of a support frame of the welding unit, so as to enable said support means to be replaced and spools of different type to be used, and comprising a brake for said spool, the improvement comprising the brake is a pivot comprising a member rigidly fixed to said support means and a rotating element carrying said spool, said pivot comprising braking means acting on the surface of said rotating element, and said support means are shaped and are connected to said wall in such a way that said spool may be removed without moving said welding units from said welding member.

2. A device as claimed in claim 1, wherein the support means comprise a movable arm hinged to one of the walls of the support frame, said arm being hinged to said wall in such a way that, without moving the welding unit, it can be rotated over and away from said unit when a spool has to be replaced.

3. A device as claimed in claim 2, wherein the pivot for a spool is associated to the movable arm.

4. A device as claimed in claim 2, wherein the movable arm comprises a member for its stable fixing to the frame when in its operating position.

5. A device as claimed in claim 1, wherein the pivot comprises a closure cap screwable to the body of said pivot and also acting as a lateral support for clamping the spool to said pivot.

6. A device as claimed in claim 5, wherein the thread of the screw cap is opposed to the sense of rotation of the spool.

7. A device as claimed in claim 1, wherein the pivot comprises a brake having an adjustment screw cooperating with braking jaws acting on a cylindrical element supporting the spool.

8. A device as claimed in claim 2, wherein the movable arm comprises a support comprising a pivot for carrying a spool, said spool having its axis of symmetry substantially perpendicular to the base of the welding unit, the spool hence being positioned vertically.

9. A device as claimed in claim 1, wherein the support means comprise a support removably connected to the frame and comprising a pivot for carrying a spool, said spool having its axis of symmetry substantially perpendicular to the base of the welding unit, the spool hence being positioned vertically.

10. A device as claimed in claim 9, wherein the pivot is removably connected to the support so as to be able to be easily replaced if spools of different type are to be used.

11. A device as claimed in claim 9, wherein the support comprises a base to which the pivot is centrally connected and which is removably fixed to walls of the frame of the welding unit.

12. In a device for internally butt-welding pipes of the type comprising a support and guide frame for an annular welding member, rotatable coaxially to the pipes to be welded and carrying a plurality of welding units each comprising support means for a spool on which welding wire is wound, said support means being removably connected to at least a wall of a support frame of the welding units, so as to enable said support means to be replaced and spools of different type to be used, and comprising a brake for said spool, the improvement comprising the support means comprise a movable arm hinged to one of the walls of the support frame, said arm being hinged to said wall in such a way that, without moving the welding unit, it can be rotated over and away from said unit when said spool has to be replaced, and that the brake is a pivot comprising a member rigidly fixed to said support means and a rotating element carrying said spool, said pivot comprising braking means acting on the surface of said rotating element said pivot being associated to the movable arm.

13. A device as claimed in claim 12, wherein the movable arm comprises a member for its stable fixing to the frame when in its operating position.

14. A device as claimed in claim 12, wherein the pivot comprises a closure cap screwable to the body of said pivot and also acting as a lateral support for clamping the spool to said pivot.

15. A device as claimed in claim 14, wherein the thread of the screw cap is opposed to the sense of rotation of the spool.

16. A device as claimed in claim 12, wherein the pivot comprises a brake having an adjustment screw cooperating with braking jaws acting on a cylindrical element supporting the spool.

17. A device as claimed in claim 12, wherein the movable arm comprises a support comprising a pivot for carrying a spool, said spool having its axis of symmetry substantially perpendicular to the base of the welding it, the spool hence being positioned vertically.

18. In a device for internally butt-welding pipes of the type comprising a support and guide frame for an annular welding member, rotatable coaxially to the pipes to be welded and carrying a plurality of welding units each comprising support means for a spool on which welding wire is wound, said support means being removably connected to at least a wall of a support frame of the welding units, so as to enable said support means to be replaced and spools of different type to be used, and comprising a brake for said spool, the improvement comprising the support means comprise a support removably connected to the frame and comprising a pivot including a member rigidly fixed to said support means and a rotating element carrying said spool, said pivot comprising braking means acting on the surface of said rotating element, said spool having its axis of symmetry substantially perpendicular to the base of the welding unit, said spool hence being positioned vertically.

19. A device as claimed in claim 18, wherein the pivot is removably connected to the support so as to be able to be easily replaced if spools of different type are to be used.

20. A device as claimed in claim 19, wherein the support comprises a base to which the pivot is centrally connected and which is removably fixed to walls of the frame of the welding unit.

* * * * *